A. T. HILL.
Nut-Lock.

No. 204,731. Patented June 11, 1878.

WITNESSES:

INVENTOR:
A. T. Hill
BY
ATTORNEYS.

UNITED STATES PATENT OFFICE.

ALVA T. HILL, OF DETROIT, MICHIGAN, ASSIGNOR TO HIMSELF AND EDWARD J. SMITH, OF SAME PLACE.

IMPROVEMENT IN NUT-LOCKS.

Specification forming part of Letters Patent No. 204,731, dated June 11, 1878; application filed April 23, 1878.

*To all whom it may concern:*

Figure 1:
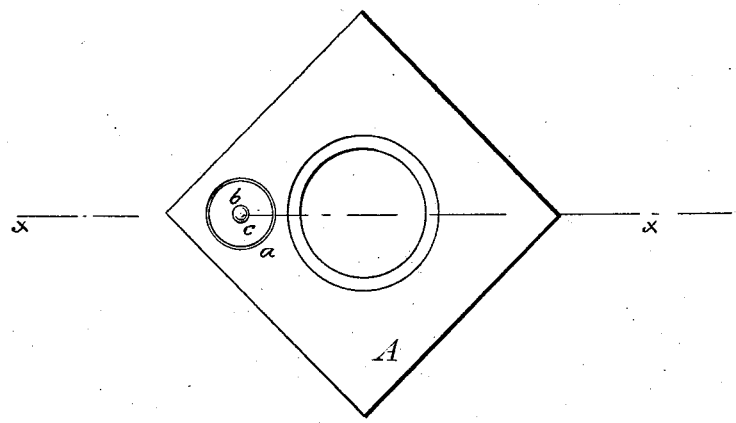
Figure 2:
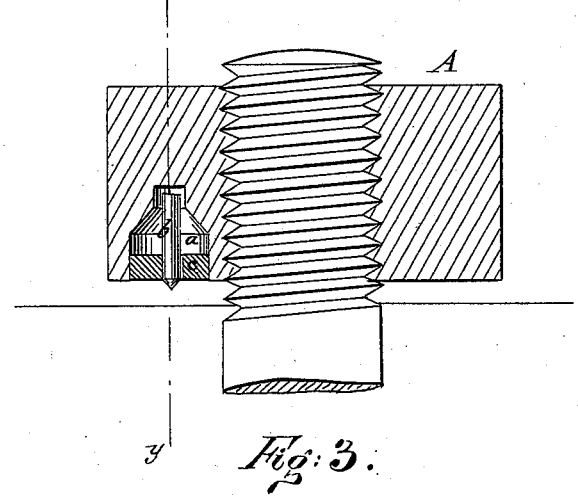
Figure 3:
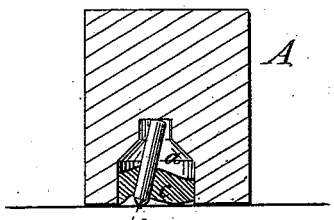

Be it known that I, ALVA T. HILL, of Detroit, in the county of Wayne and State of Michigan, have invented a new and Improved Nut-Lock, of which the following is a specification:

Figure 1 is a face view of my improved lock-nut. Fig. 2 is a transverse section taken on line $x\,x$ in Fig. 1. Fig. 3 is a detail sectional view taken on line $y\,y$ in Fig. 2, showing the position of the parts when the nut is locked.

Similar letters of reference indicate corresponding parts.

My invention consists in a nut having a counterbored cavity in its face or contact side, which contains a pointed steel pin, which is held in place by an apertured rubber disk that is fitted to the mouth of the cavity in the nut.

Referring to the drawings, A is a nut of the usual form, having a hole, $a$, drilled in its contact-face, which is reduced in diameter at the upper end to receive the upper end of the pin $b$. A centrally-apertured rubber disk, $c$, is fitted to the mouth-hole of the cavity to support the pin $b$, to exclude dirt and moisture, and to act as a spring for holding the pin $b$ in contact with the surface against which the nut is screwed. As the nut is turned in contact with its seat, the pin $b$ becomes inclined, and its lower and pointed end engages the surface, acting as a pawl in preventing the unscrewing of the nut.

When it is desired to loosen the nut, a strong wrench is applied. By turning the nut in the direction required to unscrew it, the point of the pin is made to enter the surface, which it engages, and thus permits the nut to be unscrewed. While it is possible to unscrew the nut in the manner described, it cannot become accidentally loosened.

I am aware of the existence of a nut-lock consisting of a catch-piece or pin having both its ends beveled upon the same plane, and placed in a recess which is large enough to allow it to assume an inclined position when the nut is being screwed on and a vertical position when the nut is being unscrewed.

This device has, however, no means of holding the pin in place before or after insertion, the pin being inserted by the workman when the nut is used. In my device the pin is kept in place by my rubber, which keeps the point of the said pin firmly pressed against the plate and prevents the nut from turning back, notwithstanding the jars to which it is subjected. With the rubber the pin is always kept in the nut during transportation and until used.

Having thus described my invention, I claim as new and desire to secure by Letters Patent—

The nut A, having the drill-hole $a$, the elastic disk $c$, and pointed pin $b$, in combination, substantially as herein shown and described.

ALVA T. HILL.

Witnesses:
HENRY A. HARMON,
EDWARD J. SMITH.